(12) United States Patent
Horiuchi

(10) Patent No.: US 11,926,177 B2
(45) Date of Patent: Mar. 12, 2024

(54) TIRE

(71) Applicant: The Yokohama Rubber Co., LTD., Tokyo (JP)

(72) Inventor: Kenji Horiuchi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/905,307

(22) PCT Filed: Mar. 1, 2021

(86) PCT No.: PCT/JP2021/007703
§ 371 (c)(1),
(2) Date: Aug. 30, 2022

(87) PCT Pub. No.: WO2021/177228
PCT Pub. Date: Sep. 10, 2021

(65) Prior Publication Data
US 2023/0128036 A1 Apr. 27, 2023

(30) Foreign Application Priority Data
Mar. 4, 2020 (JP) .................. 2020-036946

(51) Int. Cl.
*B60C 11/12* (2006.01)
*B60C 11/03* (2006.01)
*B60C 11/11* (2006.01)

(52) U.S. Cl.
CPC ...... *B60C 11/1218* (2013.01); *B60C 11/0304* (2013.01); *B60C 11/033* (2013.01); *B60C 11/1236* (2013.01); *B60C 2011/1213* (2013.01)

(58) Field of Classification Search
CPC ............... B60C 11/0304; B60C 11/033; B60C 2011/129; B60C 2011/1295
See application file for complete search history.

(56) References Cited

U.S. PATENT DOCUMENTS 2,261,025 A * 10/1941 Havens ................. B60C 11/042
152/DIG. 3
5,363,895 A 11/1994 Wells et al.
(Continued)

FOREIGN PATENT DOCUMENTS

DE        4136226    *  5/1993
DE   10 2012 217 968 A1   4/2013
(Continued)

OTHER PUBLICATIONS

English machine translation of DE4136226. (Year: 1993).*

*Primary Examiner* — Robert C Dye
(74) *Attorney, Agent, or Firm* — Thorpe North & Western

(57) ABSTRACT

In a tire having a specified mounting direction, groove area ratios Rin and Rout in ground contact regions on the vehicle inner and outer sides, respectively, satisfy Rin>Rout, average land portion areas Ain and Aout of intermediate regions Min and Mout on the vehicle inner and outer sides, respectively satisfy Ain<Aout, the number of blocks Nin, Nout in the intermediate regions Min, Mout, respectively, satisfy Nin≥1.5×Nout, total sipe lengths Sin, Sout in the intermediate regions Min, Mout, respectively, satisfy Sin<Sout, and sipes formed in the intermediate region Mout have a three-dimensional structure in a range of 70% or more of a sipe length.

8 Claims, 4 Drawing Sheets

(56) References Cited

U.S. PATENT DOCUMENTS

| | | | | |
|---|---|---|---|---|
| 8,997,811 B2* | 4/2015 | Watabe | ............... | B60C 11/0304 |
| | | | | 152/DIG. 3 |
| 2012/0261044 A1* | 10/2012 | Numata | .............. | B60C 11/0304 |
| | | | | 152/209.8 |
| 2013/0087261 A1* | 4/2013 | Kageyama | .......... | B60C 11/1218 |
| | | | | 152/209.8 |
| 2017/0166014 A1* | 6/2017 | Takemoto | ........... | B60C 11/1236 |

FOREIGN PATENT DOCUMENTS

| | | |
|---|---|---|
| DE | 10 2013 203 179 A1 | 9/2013 |
| JP | H04-108006 A | 4/1992 |
| JP | 2007-230251 A | 9/2007 |
| JP | 2010-6108 A | 1/2010 |
| JP | 2010-254156 A | 11/2010 |
| JP | 2013-79015 A | 5/2013 |
| JP | 2013-79017 A | 5/2013 |
| JP | 2013-252840 A | 12/2013 |
| JP | 2019-151151 A | 9/2019 |
| WO | 2019/111089 A1 | 6/2019 |

* cited by examiner

TIRE

TECHNICAL FIELD

The present technology relates to a tire in which a mounting direction with respect to a vehicle is specified and particularly relates to a tire that can provide improved wear resistance performance and snow performance in a well-balanced manner while dry performance and wet performance are improved.

BACKGROUND ART

In a known tire tread pattern, lateral grooves extending in a tire width direction are formed in land portions defined by a plurality of main grooves. Providing such lateral grooves ensures drainage properties and exhibits wet performance (steering stability performance on wet road surfaces for example) (see, for example, Japan Unexamined Patent Publication No. 2007-230251 A). Unfortunately, many lateral grooves disposed in a tread portion to improve the wet performance decrease the rigidity of the land portions, thus decreasing dry performance (steering stability performance on dry road surfaces, for example).

Providing sipes in a tread pattern ensures snow traction and exhibits snow performance (steering stability performance and braking performance on snow-covered road surfaces, for example). Unfortunately, increasing a groove area of the sipes decreases block rigidity, thus decreasing the dry performance and the wet performance. Further, a larger amount of sipes decreases the block rigidity, making it difficult to achieve excellent wear resistance performance.

SUMMARY

An object of the present technology is to provide a tire that can provide improved wear resistance performance and snow performance in a well-balanced manner while dry performance and wet performance are improved.

A tire according to an embodiment of the present technology to achieve the object described above includes at least four main grooves extending in a tire circumferential direction and a plurality of rows of land portions defined by the main grooves in a tread portion, the land portions located on a tire equator line are formed of a block row or a rib row, and a mounting direction with respect to a vehicle is specified. In the tire, a plurality of lateral grooves extending in a tire width direction is formed in an intermediate region between a main groove of the main grooves located on an innermost side in the tire width direction and a main groove of the main grooves located on an outermost side in the tire width direction on a vehicle inner side of the tread portion from the tire equator line as a boundary and an intermediate region between a main groove of the main grooves located on an innermost side in the tire width direction and a main groove of the main grooves located on an outermost side in the tire width direction on a vehicle outer side of the tread portion from the tire equator line as the boundary, the lateral grooves have a groove width of 2 mm or more and a groove depth of 50% or more of a maximum depth of the main grooves, the intermediate region on the vehicle inner side and the intermediate region on the vehicle outer side each include 50 or more blocks defined by the lateral grooves, a plurality of sipes extending in the tire width direction is formed in each of the blocks in the intermediate region on the vehicle inner side and the blocks in the intermediate region on the vehicle outer side, a groove area ratio Rin in a ground contact region on the vehicle inner side and a groove area ratio Rout in a ground contact region on the vehicle outer side satisfy a relationship Rin>Rout, an average land portion area Ain in the intermediate region on the vehicle inner side and an average land portion area Aout in the intermediate region on the vehicle outer side satisfy a relationship Ain<Aout, the number of blocks Nin in the intermediate region on the vehicle inner side and the number of blocks Nout in the intermediate region on the vehicle outer side satisfy a relationship Nin≥1.5×Nout, a total sipe length Sin in the intermediate region on the vehicle inner side and a total sipe length Sout in the intermediate region on the vehicle outer side satisfy a relationship Sin<Sout, and the sipes formed in the blocks in the intermediate region on the vehicle outer side have a three-dimensional structure in a range of 70% or more of a sipe length.

According to the present technology, the tire in which a vehicle mounting direction is specified has the groove area ratio Rin in the ground contact region on the vehicle inner side and the groove area ratio Rout in the ground contact region on the vehicle outer side satisfying the relationship Rin>Rout. Thus, differentiating the groove area ratios on the vehicle inner side and on the vehicle outer side allows dry performance (steering stability performance on dry road surfaces) and wet performance (steering stability performance on wet road surfaces) to be improved. In addition, in the intermediate region on the vehicle inner side and the intermediate region on the vehicle outer side including 50 or more blocks, the average land portion area Ain on the vehicle inner side and the average land portion area Aout on the vehicle outer side satisfy the relationship Ain<Aout, the number of blocks Nin on the vehicle inner side and the number of blocks Nout on the vehicle outer side satisfy the relationship Nin≥1.5×Nout, and the total sipe length Sin on the vehicle inner side and the total sipe length Sout on the vehicle outer side satisfy the relationship Sin<Sout. This relatively increases a sipe component in the intermediate region on the vehicle outer side, allowing snow performance (steering stability performance and braking performance on snow-covered road surfaces) to be improved. When a sipe component in the intermediate region on the vehicle inner side is relatively large, the snow performance (traction performance at the time of starting, in particular) can be improved whereas wear resistance performance is likely to be degraded. In view of this, an amount of sipes in the intermediate region on the vehicle outer side are increased more than an amount of sipes in the intermediate region on the vehicle inner side, and the amount of sipes on the vehicle inner side and the vehicle outer side is adjusted to improve the wear resistance performance. Furthermore, the sipes formed in the blocks in the intermediate region on the vehicle outer side have the three-dimensional structure in a range of 70% or more of the sipe length, thus the reduction in block rigidity due to sipes provided is supplemented, and the snow performance and the wear resistance performance can be improved in a well-balanced manner.

In the tire according to an embodiment of the present technology, the average land portion area Ain in the intermediate region on the vehicle inner side and the average land portion area Aout in the intermediate region on the vehicle outer side preferably satisfy a relationship 1.5×Ain≤Aout≤3.0×Ain. This can effectively improve wear resistance performance and snow performance.

The total sipe length Sin in the intermediate region on the vehicle inner side and the total sipe length Sout in the intermediate region on the vehicle outer side preferably satisfy a relationship 1.3×Sin≤Sout≤2.0×Sin. This can effectively improve wear resistance performance and snow performance.

The groove area ratio Rin in the ground contact region on the vehicle inner side and the groove area ratio Rout in the ground contact region on the vehicle outer side preferably satisfy a relationship 3%≤Rin−Rout≤8%. This can improve wear resistance performance and snow performance in a well-balanced manner while maintaining dry performance and wet performance.

The sipes formed in the intermediate region on the vehicle inner side and the sipes formed in the intermediate region on the vehicle outer side are preferably inclined in opposite directions with respect to the tire width direction. This can effectively improve snow performance.

An inclination angle of the sipes formed in the intermediate region on the vehicle inner side and an inclination angle of the sipes formed in the intermediate region on the vehicle outer side preferably range from 20° to 65°. This can effectively improve snow performance.

The tire according to an embodiment of the present technology is preferably a pneumatic tire but may be a non-pneumatic tire. In a case of a pneumatic tire, the interior thereof can be filled with any gas including air and inert gas such as nitrogen.

In the present technology, the ground contact region is a region in the tire width direction that corresponds to a maximum linear distance (tire ground contact width) in the tire width direction on a contact surface formed on the flat plate, when the tire is filled with air pressure corresponding to a maximum load capacity specified for each tire according to the standards (JATMA (The Japan Automobile Tyre Manufacturers Association, Inc.), TRA (The Tire and Rim Association, Inc.), ETRTO (The European Tyre and Rim Technical Organisation), and the like) based on the tire and is placed vertically on a flat plate in a stationary state and when a load equivalent to 80% of the maximum load capacity is applied. In a case of a non-pneumatic tire, a ground contact region is specified under similar load conditions. The groove area ratio Rin in the ground contact region on the vehicle inner side is a percentage (%) of a total area of groove portions included in a ground contact region on the vehicle inner side of the tread portion to a total area of the ground contact region on the vehicle inner side of the tread portion. The groove area ratio Rout in a ground contact region on the vehicle outer side is a percentage (%) of a total area of groove portions included in the ground contact region on the vehicle outer side of the tread portion to a total area of the ground contact region on the vehicle outer side of the tread portion. The average land portion area Ain in the intermediate region on the vehicle inner side is a value (mm$^2$ per the number of blocks) obtained by dividing the total area (mm$^2$) of the blocks included in the intermediate region on the vehicle inner side by the number of blocks Nin in the intermediate region on the vehicle inner side. The average land portion area Aout in the intermediate region on the vehicle outer side is a value (mm$^2$ per the number of blocks) obtained by dividing the total area (mm$^2$) of the blocks included in the intermediate region on the vehicle outer side by the number of blocks Nout in the intermediate region on the vehicle outer side. The total sipe length Sin of the intermediate region on the vehicle inner side is a sum of the sipe lengths of the sipes formed in the intermediate region on the vehicle inner side on the road contact surface. The total sipe length Sout of the intermediate region on the vehicle outer side is a sum of the sipe lengths of the sipes formed in the intermediate region on the vehicle outer side on the road contact surface.

BRIEF DESCRIPTION OF DRAWINGS

FIG. 3A illustrates sipes in an intermediate region on a vehicle inner side, and FIG. 3B illustrates sipes in an intermediate region on a vehicle outer side.

FIG. 4A is a perspective view, and FIG. 4B is a side view illustrating an inner wall surface of the sipe.

DETAILED DESCRIPTION

Figure 1:
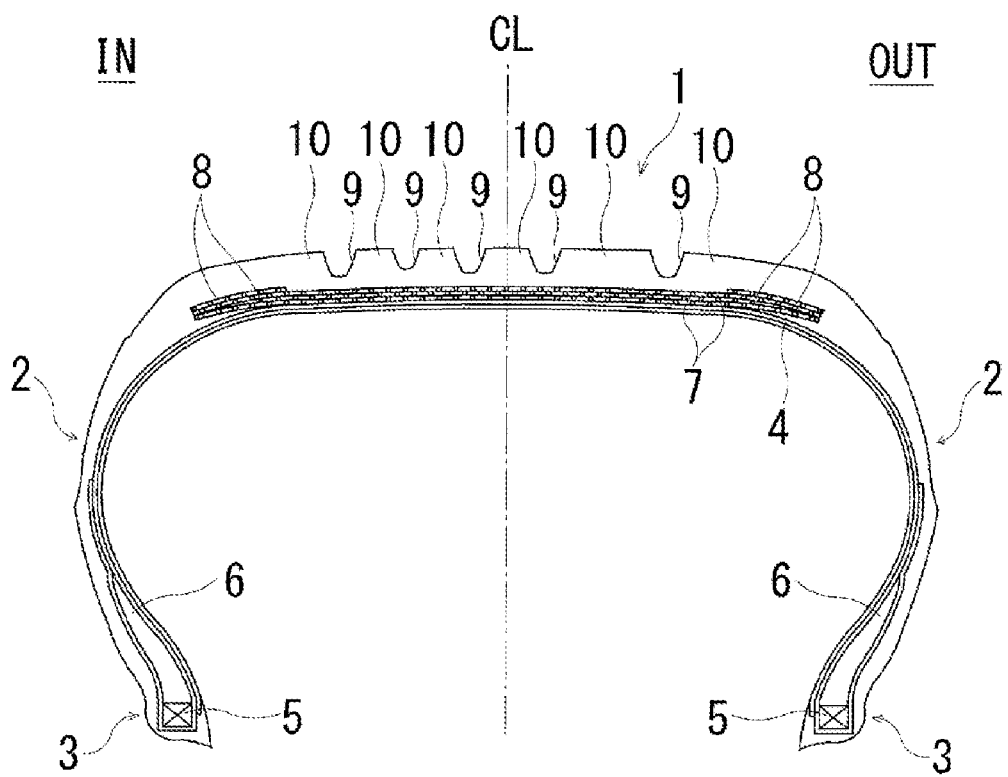
FIG. 1 is a meridian cross-sectional view illustrating one example of a pneumatic tire according to an embodiment of the present technology.
Figure 2:
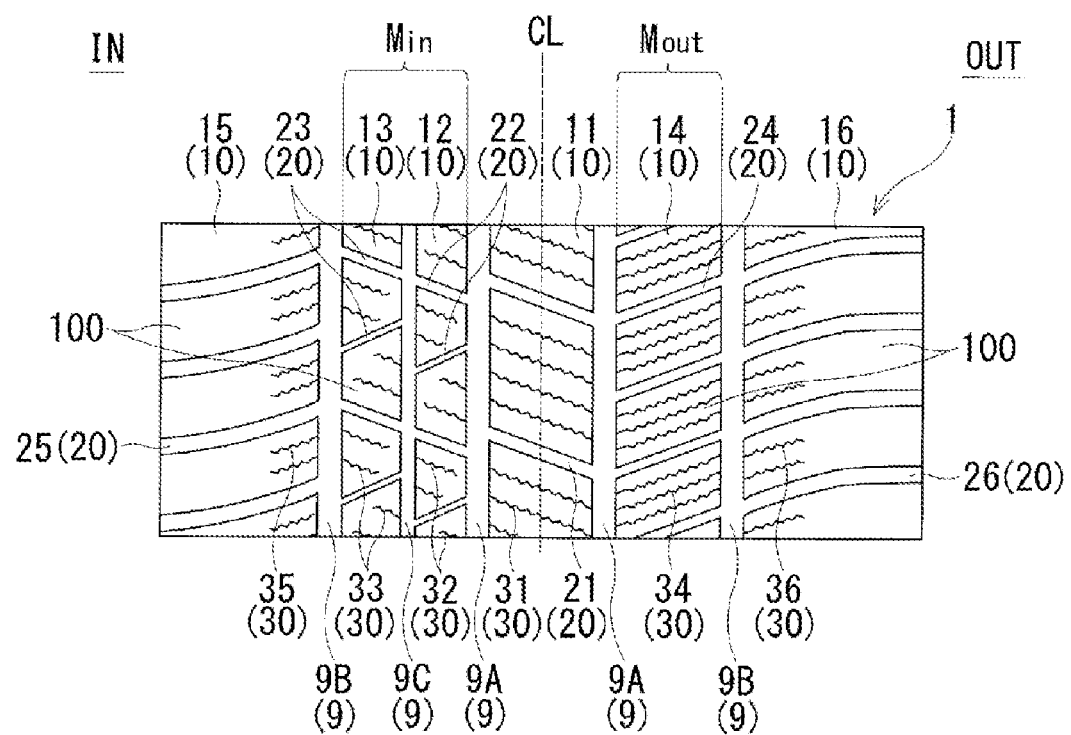
FIG. 2 is a plan view illustrating a tread portion of the pneumatic tire of FIG. 1.

A configuration according to an embodiment of the present technology will be described in detail below with reference to the accompanying drawings. FIGS. 1 and 2 illustrate a pneumatic tire according to an embodiment of the present technology. In FIGS. 1 and 2, CL denotes a tire equator line.

As illustrated in FIG. 1, a pneumatic tire according to an embodiment of the present technology has a specified mounting direction with respect to a vehicle. "IN" indicates a region on an inner side from the tire equator line CL with respect to the vehicle when the tire is mounted on the vehicle (hereinafter referred to as "vehicle inner side"), and "OUT" indicates a region on an outer side from the tire equator line CL with respect to the vehicle when the tire is mounted on the vehicle (hereinafter referred to as "vehicle outer side"). This pneumatic tire includes an annular tread portion 1 extending in the tire circumferential direction, a pair of sidewall portions 2 respectively disposed on both sides of the tread portion 1, and a pair of bead portions 3 each disposed on the inner side of the pair of sidewall portions 2 in the tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5.

On the other hand, a plurality of belt layers 7 are embedded on the outer circumferential side of the carcass layer 4 in the tread portion 1. The belt layers 7 include a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to a range of, for example, from 10° to 40°. Steel cords are preferably used as the reinforcing cords of the belt layers 7. To improve high-speed durability, at least one belt cover layer 8 formed by arranging reinforcing cords at an angle of, for example, 5° or less with respect to the tire circumferential direction is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, but the pneumatic tire is not limited thereto.

As illustrated in FIG. 2, at least four main grooves 9 extending in the tire circumferential direction are formed in the tread portion 1. In FIG. 2, the main grooves 9 include a pair of main grooves 9A each located on the innermost side in the tire width direction on the vehicle inner side and the vehicle outer side, a pair of main grooves 9B each located on the outermost side in the tire width direction on the vehicle inner side and the vehicle outer side, and a main groove 9C located between the main groove 9A and the main groove 9B on the vehicle inner side.

In the tread portion 1, a plurality of rows of land portions 10 extending in the tire circumferential direction are defined by the main grooves 9, and these land portions 10 are further defined by a plurality of lateral grooves 20 extending in the tire width direction to form a plurality of blocks 100. These blocks 100 form a plurality of sipes 30 extending in the tire width direction.

Specifically, the land portions 10 include land portions 11 located on the tire equator line CL, a pair of land portions 12 and 14 located on both sides of the land portions 11, land portions 13 located on the outer side of the land portions 12 in the tire width direction; and a pair of land portions 15 and 16 located on the outermost sides in the tire width direction. The land portions 11 (center land portions) located on the tire equator line CL are formed of a block row but may be formed of a rib row extending in the tire circumferential direction. The lateral grooves 20 include lateral grooves 21 to 26 that define the land portions 11 to 16 respectively. The sipes 30 include sipes 31 to 36 formed in the blocks 100 forming the respective land portions 11 to 16.

A region between the main groove 9A located on the innermost side in the tire width direction and the main groove 9B located on the outermost side in the tire width direction on the vehicle inner side of the tread portion 1 is an intermediate region Min, and a region between the main groove 9A located on the innermost side in the tire width direction and the main groove 9B located on the outermost side in the tire width direction on the vehicle outer side of the tread portion 1 is an intermediate region Mout. The intermediate region Min on the vehicle inner side and the intermediate region Mout on the vehicle outer side each include 50 blocks 100 or more on the tire circumference. The lateral grooves 22 to 24 in the intermediate regions Min and Mout each have a groove width of 2 mm or more, and a groove depth of 50% or more of the maximum depth of the main groove 9.

Figure 3A:
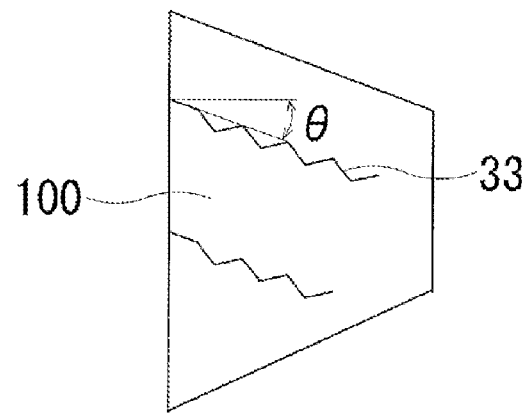
FIGS. 3A and 3B are plan views illustrating sipes formed in a block included in an intermediate region of the tread portion.
Figure 3B:
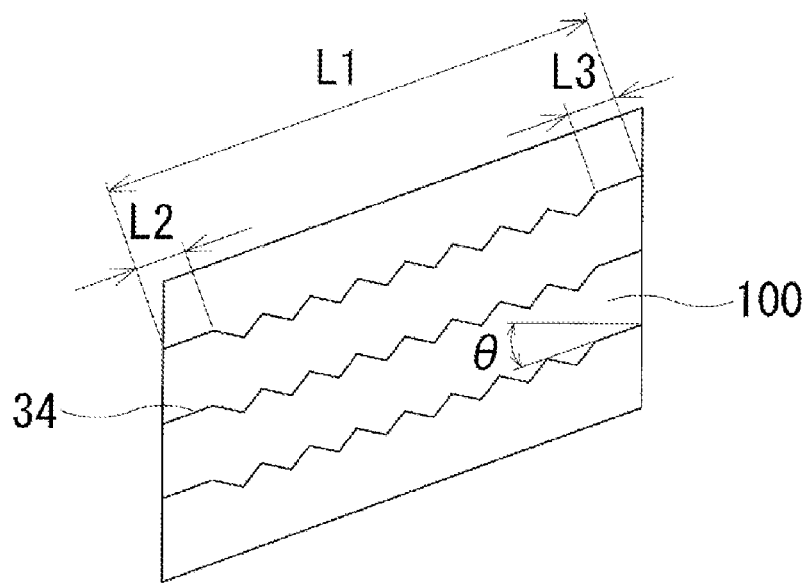

The sipes 32 and 33 formed in the blocks 100 in the intermediate region Min (the land portions 12 and 13) on the vehicle inner side have one ends in communication with the main grooves 9 and have the other ends terminated within the blocks 100. Thus, the sipes 32 and 33 are semi-closed sipes. The sipes 34 formed in the block 100 in the intermediate region Mout on the vehicle outer side (land portion 14) have both ends in communication with the main grooves 9. Thus, the sipes 34 are open sipes. Furthermore, the sipes 32 and 33 in the intermediate region Min on the vehicle inner side and the sipes 34 in the intermediate region Mout on the vehicle outer side are inclined at an inclination angle θ (see FIGS. 3A and 3B) with respect to the tire width direction.

Figure 4A:
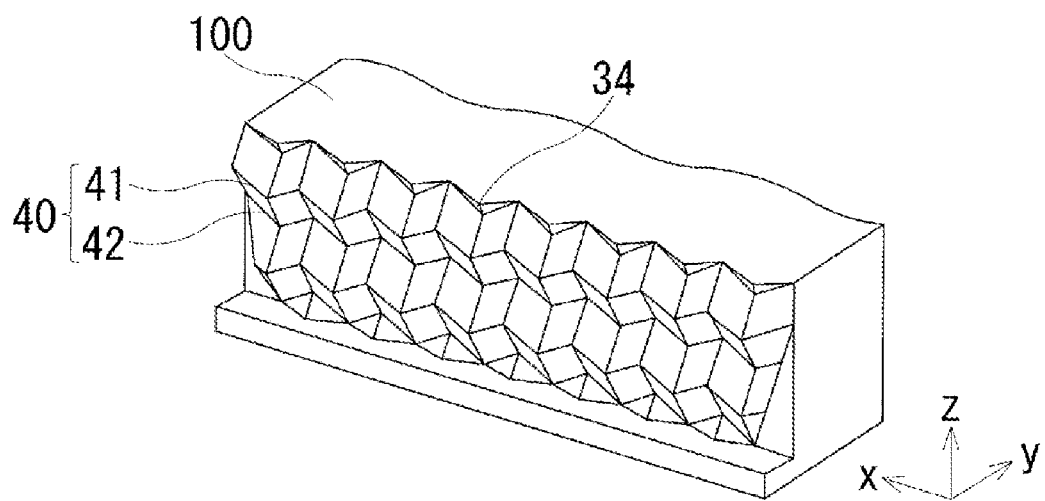
FIGS. 4A and 4B are side views illustrating a sipe formed on a block in the intermediate region on the vehicle outer side of the tread portion.
Figure 4B:
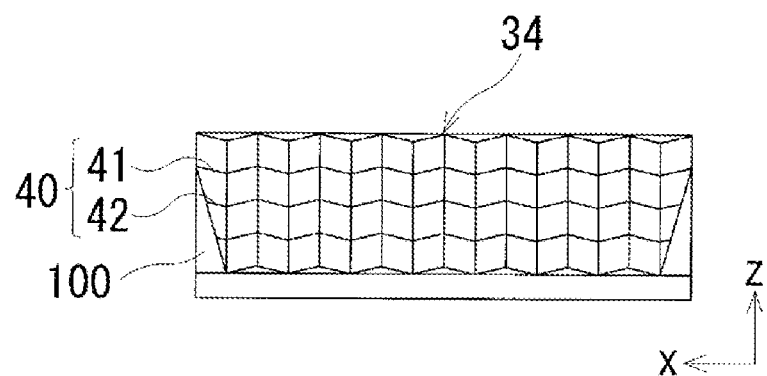

The sipes 34 in the intermediate region Mout on the vehicle outer side entirely or partially have a three-dimensional structure. Specifically, as illustrated in FIGS. 4A and 4B, in the block 100, a plurality of bent portions 40 bent in a direction (y direction) orthogonal to a sipe extension direction (x direction) at a plurality of portions in a sipe depth direction (z direction), are continuously formed in the sipe extension direction, to be in a zigzag shape on the road contact surface. The bent portions 40 include a bent portion 41 of a protruding form and a bent portion 42 of a recessed form. On a wall surface of one side of the sipe 34, these protruding and recessed bent portions 41 and 42 are alternately arranged, with the protruding and recessed bent portions 41 and 42 on the facing wall surface (not illustrated) on the opposite side being in the positional relationship opposite thereto. With the sipe 34 thus provided with the bent portions 40 bent in the tire circumferential direction, small blocks on both sides of the sipe 34 are meshed with each other at the time of driving/braking to suppress the deformation of the block 100, so that the block 100 can be prevented from flexing in the tire circumferential direction. The sipe length of the sipe 34 measured on the surface of the tread portion 1 is greater than the sipe length on a groove bottom, and the sipe length of the sipe 34 gradually decreasing toward the groove bottom. The bent shape in the sipe 34 on the surface of and inside the block 100 is not limited to a particular shape.

Further, the sipes 34 in the intermediate region Mout on the vehicle outer side have the three-dimensional structure in a range of 70% or more of a sipe length L1 measured on the road contact surface in the extension direction. In other words, the percentage of lengths L2 and L3 of portions of the sipe 34 without the three-dimensional structure (see FIG. 3B) with respect to the sipe length L1 is less than 30% ((L2+L3)/L1×100%). In the sipe 34, the portions (end portions of the sipe) without the three-dimensional structure include no bent portion 40 inside the block 100, resulting in parallel wall surfaces formed.

In the tire described above, a groove area ratio Rin in the ground contact region on the vehicle inner side and a groove area ratio Rout in the ground contact region on the vehicle outer side satisfy the relationship Rin>Rout. In addition, in the intermediate region Min on the vehicle inner side and the intermediate region Mout on the vehicle outer side, an average land portion area Ain on the vehicle inner side and an average land portion area Aout on the vehicle outer side satisfy the relationship Ain<Aout. The number of blocks Nin on the vehicle inner side and the number of blocks Nout on the vehicle outer side satisfy the relationship Nin≥1.5×Nout. A total sipe length Sin on the vehicle inner side and a total sipe length Sout on the vehicle outer side satisfy the relationship Sin<Sout. The number of blocks Nin on the vehicle inner side and the number of blocks Nout on the vehicle outer side preferably satisfy the relationship Nin≤3.0×Nout, indicating the upper limit.

The tire described above in which a vehicle mounting direction is specified has the groove area ratio Rin in the ground contact region on the vehicle inner side and the groove area ratio Rout in the ground contact region on the vehicle outer side satisfying the relationship Rin>Rout. Thus, differentiating the groove area ratios Rin and Rout on the vehicle inner side and on the vehicle outer side allows the dry performance (steering stability performance on dry road surfaces) and wet performance (steering stability performance on wet road surfaces) to be improved. In addition, in the intermediate region Min on the vehicle inner side and the intermediate region Mout on the vehicle outer side including 50 or more blocks 100, the average land portion area Ain on the vehicle inner side and the average land portion area Aout on the vehicle outer side satisfy the relationship Ain<Aout, the number of blocks Nin on the vehicle inner side and the number of blocks Nout on the vehicle outer side satisfy the relationship Nin≥1.5×N out, and the total sipe length Sin on the vehicle inner side and the total sipe length Sout on the vehicle outer side satisfy the relationship Sin<Sout. This relatively increases the sipe component in the intermediate region Mout on the vehicle outer side, allowing the snow performance (steering stability performance and braking performance on snow-covered road surfaces) to be improved. When a sipe component in the intermediate region Min on the vehicle inner side is relatively large, the snow performance (traction performance at the time of starting, in particular) can be improved whereas wear resistance performance is likely to be degraded. In view of this, an amount of sipes in the intermediate region Mout on the vehicle outer side are increased more than an amount of sipes in the intermediate region Min on the vehicle inner side, and the amount of sipes on the vehicle inner side and the vehicle outer side is adjusted to improve the wear resistance performance. Furthermore, the sipes 34 formed in the block 100 in the intermediate region Mout on the vehicle outer side have the three-dimensional structure in a range of 70% or more of the sipe length L1. Thus, with the sipes 34 provided, the reduction in the block rigidity is compensated, so that the snow performance and the wear resistance performance can be improved in a well-balanced manner.

In the tire described above, the average land portion area Ain of the blocks 100 included in the intermediate region Min on the vehicle inner side and the average land portion area Aout of the blocks 100 included in the intermediate region Mout on the vehicle outer side preferably satisfy the relationship 1.5×Ain≤Aout≤3.0×Ain. With the ratio between the average land portion area Ain on the vehicle inner side and the average land portion area Aout on the vehicle outer side thus appropriately set, the wear resistance performance and the snow performance can be effectively improved.

When the average land portion area Ain on the vehicle inner side is excessively larger than the average land portion area Aout on the vehicle outer side, the effect of improving the snow performance cannot be sufficiently achieved. When the average land portion area Ain on the vehicle inner side is excessively smaller than the average land portion area Aout on the vehicle outer side, the wear resistance performance is likely to be degraded.

The total sipe length Sin of the sipes 32 and 33 included in the intermediate region Min on the vehicle inner side and the total sipe length Sout of the sipes 34 included in the intermediate region Mout on the vehicle outer side preferably satisfy the relationship 1.3×Sin≤Sout≤2.0×Sin. With the ratio between the total sipe length Sin on the vehicle inner side and the total sipe length Sout on the vehicle outer side thus appropriately set, the sipe component in the intermediate region Mout on the vehicle outer side increases, so that the wear resistance performance and the snow performance can be effectively improved.

When the total sipe length Sout on the vehicle outer side is excessively greater than the total sipe length Sin on the vehicle inner side, the wear resistance performance is degraded, or the snow performance is degraded due to shortage of sipes on the vehicle inner side. When the total sipe length Sout on the vehicle outer side is excessively smaller than the total sipe length Sin on the vehicle inner side, the effect of improving the snow performance cannot be sufficiently achieved.

The groove area ratio Rin in the ground contact region on the vehicle inner side and the groove area ratio Rout in the ground contact region on the vehicle outer side preferably satisfy the relationship 3%≤Rin−Rout≤8%. Setting a difference between the groove area ratio Rin in the ground contact region on the vehicle inner side and the groove area ratio Rout in the ground contact region on the vehicle outer side to the range described above allows the wear resistance performance and the snow performance to be improved in a well-balanced manner while maintaining the dry performance and the wet performance.

When the difference does not fall within the range described above due to the groove area ratio Rin in the ground contact region on the vehicle inner side set to be excessively high or low, the wear resistance performance and the snow performance cannot be improved in a well-balanced manner.

The sipes 32 and 33 formed in the intermediate region Min on the vehicle inner side and the sipes 34 formed in the intermediate region Mout on the vehicle outer side are preferably inclined in opposite directions with respect to the tire width direction. In other words, with the sipes 32 and 33 formed in the intermediate region Min on the vehicle inner side and the sipes 34 formed in the intermediate region Mout on the vehicle outer side not being inclined in the same direction, various behaviors of the tire can be taken care of. Furthermore, the inclination angle θ of the sipes 32 and 33 on the vehicle inner side (see FIG. 3A) and the inclination angle θ of the sipes 34 on the vehicle outer side (see FIG. 3B) preferably range from 20° to 65°. With the inclination angle θ of the sipes 32 to 34 thus appropriately set, the snow performance can be effectively improved.

The present technology can be suitably used for all-season tires used throughout the year and for winter tires. The hardness of rubber layer constituting the tread portion 1 is preferably set to 65 or less. The hardness is a durometer hardness defined in JIS (Japanese Industrial Standard)-K6253 and is measured at a temperature of 20° C. using a type A durometer.

Examples

Tires according to Conventional Examples 1 and 2, Comparative Examples 1 and 2, and Examples 1 to 6 were manufactured as pneumatic tires having a tire size of 225/65R17, including at least four main grooves extending in the tire circumferential direction and a plurality of land portions defined by the main grooves in a tread portion with land portions located on the tire equator line formed of a block row or a rib row and with a mounting direction with respect to a vehicle specified. In the pneumatic tires, the number of main grooves, presence of a center land portion, a symmetry of a tread pattern, the size relationship between groove area ratios R on the vehicle inner side and the vehicle outer side, the size relationship between average land portion areas A in the intermediate regions on the vehicle inner side and the vehicle outer side, the number of blocks Nin in the intermediate region on the vehicle inner side, the number of blocks Nout in the intermediate region on the vehicle outer side, the size relationship between total sipe lengths S in the intermediate regions on the vehicle inner side and the vehicle outer side, the percentage of the three-dimensional structure of the sipes in the intermediate region on the vehicle outer side, the ratio of average land portion area A in the intermediate region (Aout/Ain), the ratio of total sipe length S in the intermediate region (Sout/Sin), the difference in groove area ratio R (Rin−Rout), the inclination angle θ of sipe in the intermediate region on the vehicle inner side, and the inclination angle θ of sipe in the intermediate region on the vehicle outer side were set as in Table 1.

In Table 1, regarding the size relationship between the groove area ratios R on the vehicle inner side and the vehicle outer side, "equivalent" means that the groove area ratios on the vehicle inner side and the vehicle outer side are the same, and "inner side" means that the groove area ratio Rin on the vehicle inner side is greater than the groove area ratio Rout on the vehicle outer side. Regarding the size relationship between the average land portion areas A in intermediate regions on the vehicle inner side and the vehicle outer side, "equivalent" means that the average land portion areas on the vehicle inner side and the vehicle outer side are the same, and "outer side" means that the average land portion area Aout on the vehicle outer side is larger than the average land portion area Ain on the vehicle inner side. Regarding the size relationship between total sipe lengths S in the intermediate regions on the vehicle inner side and the vehicle outer side, "equivalent" means that the total sipe lengths on the vehicle inner side and the vehicle outer side are the same, "inner side" means that the total sipe length Sin on the vehicle inner side is greater than the total sipe length Sout on the vehicle outer side, and "outer side" means that the total sipe length Sout on the vehicle outer side is greater than the total sipe length Sin on the vehicle inner side.

The snow performance and the wear resistance performance of these test tires were evaluated, and the results were recorded in Table 1.

Snow Performance:

For sensory evaluation regarding the steering stability performance on snow-covered road surfaces and braking evaluation regarding braking performance on snow-covered road surfaces, the test tires were mounted on wheels having a rim size of 17×7.0 J, inflated to air pressure of 230 kPa, and mounted on a four wheel drive vehicle, and test drive was performed by a test driver on a test course. Evaluation results are expressed as index values, with the results of Conventional Example 1 being assigned as an index value of 100. A larger index value indicates superior steering stability performance and braking performance on snow-covered road surfaces.

Wear Resistance Performance:

The test tires were mounted on wheels having a rim size of 17×7.0 J, inflated to air pressure of 230 kPa, and mounted on a four wheel drive vehicle, and test drive was performed by a test driver on a test course. For the test drive, the estimated wear life was calculated after driving 8000 km on the test course. Evaluation results are expressed as index values, with the results of Conventional Example 1 being assigned as an index value of 100. Larger index values mean longer wear life and superior wear resistance performance.

TABLE 1

|  | Conventional Example 1 | Conventional Example 2 | Comparative Example 1 |
|---|---|---|---|
| Number of main grooves | 4 | 4 | 5 |
| Presence of center land portion | Yes | Yes | Yes |
| Symmetry of tread pattern | Symmetric | Asymmetric | Asymmetric |
| Size relationship between groove area ratios R on vehicle inner side and vehicle outer side | Equivalent | Inner side | Inner side |
| Size relationship between average land portion areas A in intermediate region on vehicle inner side and vehicle outer side | Equivalent | Outer side | Outer side |
| Number of blocks Nin in intermediate region on vehicle inner side | 70 | 70 | 140 |
| Number of blocks Nout in intermediate region on vehicle outer side | 70 | 70 | 70 |
| Size relationship between total sipe lengths S in intermediate regions on vehicle inner side and vehicle outer side | Equivalent | Inner side | Outer side |
| Percentage of three-dimensional structure in sipe in intermediate region on vehicle inner side (%) | 0 | 0 | 0 |
| Ratio of average land portion area A in intermediate region (Aout/Ain) | 1.0 | 1.2 | 1.4 |
| Ratio of total sipe length S in intermediate region (Sout/Sin) | 1.0 | 0.9 | 1.2 |
| Difference in groove area ratio R (Rin − Rout) [%] | 0 | 2.5 | 2.5 |
| Inclination angle θ of sipe in intermediate region on vehicle inner side (°) | 15 | 15 | 15 |
| Inclination angle θ of sipe in intermediate region on vehicle outer side (°) | 15 | 15 | 15 |
| Snow performance | 100 | 95 | 97 |
| Wear resistance performance | 100 | 99 | 101 |

TABLE 1-continued

|  | Comparative Example 2 | Example 1 | Example 2 |
|---|---|---|---|
| Number of main grooves | 5 | 5 | 5 |
| Presence of center land portion | Yes | Yes | Yes |
| Symmetry of tread pattern | Asymmetric | Asymmetric | Asymmetric |
| Size relationship between groove area ratios R on vehicle inner side and vehicle outer side | Inner side | Inner side | Inner side |
| Size relationship between average land portion areas A in intermediate region on vehicle inner side and vehicle outer side | Outer side | Outer side | Outer side |
| Number of blocks Nin in intermediate region on vehicle inner side | 140 | 140 | 140 |
| Number of blocks Nout in intermediate region on vehicle outer side | 70 | 70 | 70 |
| Size relationship between total sipe lengths S in intermediate regions on vehicle inner side and vehicle outer side | Outer side | Outer side | Outer side |
| Percentage of three-dimensional structure in sipe in intermediate region on vehicle inner side (%) | 45 | 85 | 85 |
| Ratio of average land portion area A in intermediate region (Aout/Ain) | 1.4 | 1.4 | 2.0 |
| Ratio of total sipe length S in intermediate region (Sout/Sin) | 1.2 | 1.2 | 1.2 |
| Difference in groove area ratio R (Rin − Rout) [%] | 2.5 | 2.5 | 2.5 |
| Inclination angle θ of sipe in intermediate region on vehicle inner side (°) | 15 | 15 | 15 |
| Inclination angle θ of sipe in intermediate region on vehicle outer side (°) | 15 | 15 | 15 |
| Snow performance | 98 | 101 | 103 |
| Wear resistance performance | 102 | 105 | 104 |

|  | Example 3 | Example 4 | Example 5 | Example 6 |
|---|---|---|---|---|
| Number of main grooves | 5 | 5 | 5 | 5 |
| Presence of center land portion | Yes | Yes | Yes | Yes |
| Symmetry of tread pattern | Asymmetric | Asymmetric | Asymmetric | Asymmetric |
| Size relationship between groove area ratios R on vehicle inner side and vehicle outer side | Inner side | Inner side | Inner side | Inner side |
| Size relationship between average land portion areas A in intermediate region on vehicle inner side and vehicle outer side | Outer side | Outer side | Outer side | Outer side |
| Number of blocks Nin in intermediate region on vehicle inner side | 140 | 140 | 140 | 140 |
| Number of blocks Nout in intermediate region on vehicle outer side | 70 | 70 | 70 | 70 |
| Size relationship between total sipe lengths S in intermediate regions on vehicle inner side and vehicle outer side | Outer side | Outer side | Outer side | Outer side |
| Percentage of three-dimensional structure in sipe in intermediate region on vehicle inner side (%) | 85 | 85 | 85 | 85 |
| Ratio of average land portion area A in intermediate region (Aout/Ain) | 2.0 | 2.0 | 2.0 | 2.0 |
| Ratio of total sipe length S in intermediate region (Sout/Sin) | 1.5 | 1.5 | 1.5 | 1.5 |
| Difference in groove area ratio R (Rin − Rout) [%] | 2.5 | 5.0 | 5.0 | 5.0 |

TABLE 1-continued

| | | | | |
|---|---|---|---|---|
| Inclination angle θ of sipe in intermediate region on vehicle inner side (°) | 15 | 15 | 15 | 35 |
| Inclination angle θ of sipe in intermediate region on vehicle outer side (°) | 15 | 15 | −15 | −35 |
| Snow performance | 104 | 106 | 108 | 110 |
| Wear resistance performance | 103 | 105 | 105 | 105 |

As can be seen from Table 1, the tires of Examples 1 to 6 achieved improvement in both snow performance and wear resistance performance, from those achieved by Conventional Example 1.

On the other hand, although Conventional Example 2 provides the bilaterally asymmetric tread pattern with respect to the tire equator line, the number of blocks in the intermediate region on the vehicle inner side and the number of blocks in the intermediate region on the vehicle outer side are equivalent, and the sipes in the intermediate region on the vehicle outer side had no three-dimensional structure, degrading snow performance. With Comparative Example 1, snow performance was degraded, and sufficient wear resistance performance improvement effect was unachievable, because the sipes in the intermediate region on the vehicle outer side had no three-dimensional structure. With Comparative Example 2, snow performance was degraded, and sufficient wear resistance performance improvement effect was unachievable, because the percentage of the three-dimensional structure of the sipes in the intermediate region on the vehicle outer side was set to be low.

The invention claimed is:

1. A tire, comprising
at least four main grooves extending in a tire circumferential direction and a plurality of rows of land portions defined by the main grooves in a tread portion, of the plurality of rows of land portions a land portion row located on a tire equator line being formed of a block row or a rib row, a mounting direction with respect to a vehicle being specified,
a plurality of lateral grooves extending in a tire width direction being formed in an intermediate region between a main groove of the main grooves located on an innermost side in the tire width direction and a main groove of the main grooves located on an outermost side in the tire width direction on a vehicle inner side of the tread portion from the tire equator line as a boundary and an intermediate region between a main groove of the main grooves located on an innermost side in the tire width direction and a main groove of the main grooves located on an outermost side in the tire width direction on a vehicle outer side of the tread portion from the tire equator line as the boundary,
the lateral grooves having a groove width of 2 mm or more and a groove depth of 50% or more of a maximum depth of the main grooves,
the intermediate region on the vehicle inner side and the intermediate region on the vehicle outer side each comprising 50 or more blocks defined by the lateral grooves,
a plurality of sipes extending in the tire width direction being formed in each of the blocks in the intermediate region on the vehicle inner side and the blocks in the intermediate region on the vehicle outer side,
a groove area ratio Rin in a ground contact region on the vehicle inner side and a groove area ratio Rout in a ground contact region on the vehicle outer side satisfying a relationship Rin>Rout, an average land portion area Ain of the intermediate region on the vehicle inner side and an average land portion area Aout of the intermediate region on the vehicle outer side satisfying a relationship Ain<Aout, the number of blocks Nin in the intermediate region on the vehicle inner side and the number of blocks Nout in the intermediate region on the vehicle outer side satisfying a relationship Nin≥1.5×Nout, a total sipe length Sin in the intermediate region on the vehicle inner side and a total sipe length Sout in the intermediate region on the vehicle outer side satisfying a relationship Sin<Sout,
the sipes formed in the blocks in the intermediate region on the vehicle outer side having a three-dimensional structure in a range of 70% or more of a sipe length, and
all of the sipes formed in the intermediate region on the vehicle inner side being inclined in a same first inclination direction and all of the sipes formed in the intermediate region on the vehicle outer side being inclined in a same second inclination direction opposite to the first inclination direction with respect to the tire width direction.

2. The tire according to claim 1, wherein the average land portion area Ain in the intermediate region on the vehicle inner side and the average land portion area Aout in the intermediate region on the vehicle outer side satisfy a relationship 1.5×Ain≤Aout≤3.0×Ain.

3. The tire according to claim 1, wherein the total sipe length Sin in the intermediate region on the vehicle inner side and the total sipe length Sout in the intermediate region on the vehicle outer side satisfy a relationship 1.3×Sin≤Sout≤2.0×Sin.

4. The tire according to claim 1, wherein the groove area ratio Rin in the ground contact region on the vehicle inner side and the groove area ratio Rout in the ground contact region on the vehicle outer side satisfy a relationship 3%≤Rin−Rout≤8%.

5. The tire according to claim 1, wherein an inclination angle of the sipes formed in the intermediate region on the vehicle inner side and an inclination angle of the sipes formed in the intermediate region on the vehicle outer side range from 20° to 65° with respect to the tire width direction.

6. The tire according to claim 2, wherein the total sipe length Sin in the intermediate region on the vehicle inner side and the total sipe length Sout in the intermediate region on the vehicle outer side satisfy a relationship 1.3×Sin≤Sout≤2.0×Sin.

7. The tire according to claim 6, wherein the groove area ratio Rin in the ground contact region on the vehicle inner side and the groove area ratio Rout in the ground contact region on the vehicle outer side satisfy a relationship 3%≤Rin−Rout≤8%.

8. The tire according to claim 7, wherein an inclination angle of the sipes formed in the intermediate region on the vehicle inner side and an inclination angle of the sipes formed in the intermediate region on the vehicle outer side range from 20° to 65° with respect to the tire width direction.

* * * * *